United States Patent
Zhang et al.

(10) Patent No.: US 12,526,076 B2
(45) Date of Patent: Jan. 13, 2026

(54) RETRANSMISSION METHOD AND APPARATUS FOR SIDELINK TRANSMISSION

(71) Applicant: 1FINITY Inc., Kawasaki (JP)

(72) Inventors: Jian Zhang, Beijing (CN); Guorong Li, Beijing (CN); Pengyu Ji, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 323 days.

(21) Appl. No.: 17/878,999

(22) Filed: Aug. 2, 2022

(65) Prior Publication Data

US 2022/0368461 A1 Nov. 17, 2022

Related U.S. Application Data

(63) Continuation of application No. PCT/CN2020/075041, filed on Feb. 13, 2020.

(51) Int. Cl.
*H04L 1/08* (2006.01)
*H04L 1/00* (2006.01)
(Continued)

(52) U.S. Cl.
CPC .............. *H04L 1/08* (2013.01); *H04L 1/0061* (2013.01); *H04L 1/1812* (2013.01); *H04W 72/23* (2023.01)

(58) Field of Classification Search
CPC ....... H04L 1/08; H04L 1/0061; H04L 1/1812; H04L 1/1838; H04L 1/1854;
(Continued)

(56) References Cited

U.S. PATENT DOCUMENTS

| 2017/0289733 A1 | 10/2017 | Rajagopal et al. |
| 2017/0339670 A1 | 11/2017 | Chae et al. |

(Continued)

FOREIGN PATENT DOCUMENTS

| CN | 106688295 A | 5/2017 |
| CN | 107148800 A | 9/2017 |

(Continued)

OTHER PUBLICATIONS

International Search Report and Written Opinion of the International Searching Authority issued by the China National Intellectual Property Administration for corresponding International Patent Application No. PCT/CN2020/075041, mailed on Oct. 29, 2020, with an English translation.

(Continued)

*Primary Examiner* — Thai Nguyen
(74) *Attorney, Agent, or Firm* — Myers Wolin, LLC

(57) ABSTRACT

A retransmission method and apparatus for sidelink transmission. The method includes: receiving, by a terminal equipment, downlink control information (DCI) of which CRC being scrambled by an SL-CS-RNTI; and when a dynamic grant resource scheduled by the downlink control information is not used to transmit sidelink retransmission, transmitting indication information via a physical uplink control channel indicated by the downlink control information, the indication information indicating success of sidelink transmission or that a network device is not needed to schedule retransmission.

20 Claims, 7 Drawing Sheets

(51) Int. Cl.
*H04L 1/1812* (2023.01)
*H04W 72/23* (2023.01)

(58) Field of Classification Search
CPC .... H04L 1/1896; H04L 1/1822; H04W 72/23; H04W 76/14; H04W 72/20
See application file for complete search history.

(56) References Cited

U.S. PATENT DOCUMENTS

| | | | |
|---|---|---|---|
| 2018/0279327 A1 | 9/2018 | Ying et al. | |
| 2018/0338319 A1 | 11/2018 | Kim et al. | |
| 2019/0349145 A1 | 11/2019 | You | |
| 2020/0305139 A1 | 9/2020 | Xu et al. | |
| 2021/0250772 A1* | 8/2021 | Farag | H04W 16/02 |

FOREIGN PATENT DOCUMENTS

| | | | | |
|---|---|---|---|---|
| CN | 108207036 A | 6/2018 | | |
| CN | 108347307 A | 7/2018 | | |
| CN | 108632743 A | 10/2018 | | |
| CN | 109245869 A | 1/2019 | | |
| CN | 110419186 A | 11/2019 | | |
| CN | 110740016 A | 1/2020 | | |
| EP | 4090089 A1 * | 11/2022 | | H04W 72/20 |
| JP | 2018-505626 A | 2/2018 | | |
| WO | 2016/133777 A1 | 8/2016 | | |
| WO | 2018/201679 A1 | 11/2018 | | |
| WO | 2019/069234 A1 | 4/2019 | | |

OTHER PUBLICATIONS

Second Notification of Office Action and Search Report issued by the China National Intellectual Property Administration for corresponding Chinese Patent Application No. 202080092963.2, mailed on Aug. 10, 2023, with an English translation.
Zte et al., "Basic Grant-free Transmission for URLLC", Agenda Item: 8.1.3.4.3, 3GPP TSG-RAN WG1 Meeting #88, R1-1701594, Athens, Greece, Feb. 13-17, 2017.
Notice of Reasons for Refusal issued by the Japan Patent Office for corresponding Japanese Patent Application No. 2022-548415, mailed on Jan. 9, 2024, with an English translation.
Spreadtrum Communications, "Consideration on NR sidelink mode 1 resource allocation", Agenda Item: 7.2.4.2.1, 3GPP TSG RAN WG1 #98bis, R1-1910006, Chongqing, China, Oct. 14-20, 2019.
Notice of Reasons for Refusal issued by the Japan Patent Office for corresponding Japanese Patent Application No. 2022-548415, mailed on Jul. 25, 2023, with an English translation.
Samsung, "On Resource Allocation for NR V2X Mode 1", Agenda Item: 7.2.4.2.1, 3GPP TSG-RAN WG1 Meeting #99, R1-1912459, Reno, USA, Nov. 18-22, 2019.
First Notification of Office Action and Search Report issued by the China National Intellectual Property Administration for corresponding Chinese Patent Application No. 202080092963.2, dated Mar. 3, 2023, with an English translation.
Zte et al., "Mode 1 resource allocation schemes on sidelink", Agenda item: 7.2.4.2.1, 3GPP TSG RAN WG1 #98bis, R1-1910278, Chongqing, China, Oct. 14-20, 2019.
Notice of Reasons for Refusal issued by the Japan Patent Office for corresponding Japanese Patent Application No. 2022-548415, mailed on Apr. 22, 2025, with an English translation.

* cited by examiner

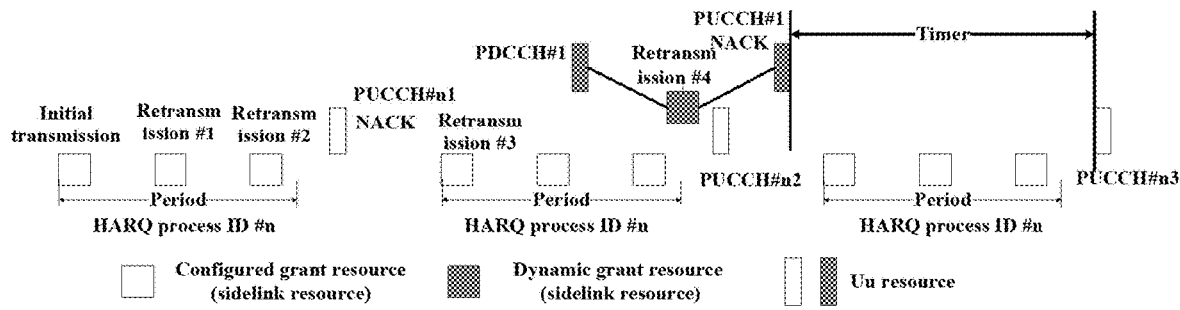

Fig. 10

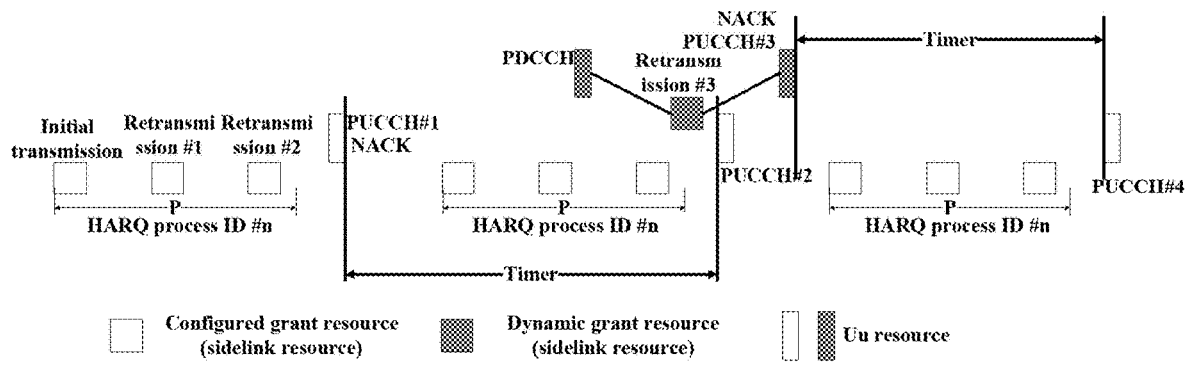

Fig. 11

1201 a network device receives indication information (NACK) transmitted by a terminal equipment at a PUCCH associated with a configured grant resource, the indication information being used for indicating failure of sidelink transmission or that the network device is needed to schedule retransmission

1202 the network device transmits DCI of which CRC being scrambled by an SL-CS-RNTI; wherein the DCI and a dynamic grant resource scheduled by the DCI are after the PUCCH and before a next configured grant resource applicable to identical HARQ process, and the DCI schedules sidelink retransmission of the HARQ process

Fig. 12

RETRANSMISSION METHOD AND APPARATUS FOR SIDELINK TRANSMISSION

CROSS-REFERENCE TO RELATED APPLICATION

This application is a continuation application of International Application PCT/CN2020/075041 filed on Feb. 13, 2020, and designated the U.S., the entire contents of which are incorporated herein by reference.

TECHNICAL FIELD

This disclosure relates to the field of communication technologies.

BACKGROUND

V2X (Vehicle to Everything) is a vehicle communication technology. Compared with the cellular communication using a Uu link (including uplink and downlink), a transmitting terminal equipment of V2X communicates directly with a receiving terminal equipment via a sidelink.

New Radio (NR) V2X is an important project of 5G NR. Compared with Long Term Evolution (LTE) V2X, NR V2X needs to support many new scenarios and new services, and needs to meet higher technical indicators.

NR V2X defines several physical channels, including a physical sidelink control channel (PSCCH), a physical sidelink shared channel (PSSCH), and a physical sidelink feedback channel (PSFCH), which are respectively used to carry sidelink control information (SCI), sidelink data and sidelink feedback information (such as HARQ-ACK).

NR V2X defines two operating modes. For NR V2X Mode 1, time-frequency resources used by a terminal equipment for V2X communication are scheduled and allocated by a network device (such as a base station) via an NR Uu link, and the terminal equipment may feed back ACK/NACK to the network device via a physical uplink control channel (PUCCH). And for NR V2X Mode 2, the terminal equipment may autonomously select time-frequency resources for V2X communication based on a sensing result.

Mode 1 includes two modes, dynamic grant (DG) and configured grant (CG). The terminal equipment may use dynamic grant resources or configured grant resources for sidelink transmission (including initial transmission or retransmission).

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that for a configuration grant configured with a PUCCH, when dynamic grant resources and configuration grant resources may be used by retransmission, a situation will occur that although a network device schedules the dynamic grant resources, no information is transmitted on the dynamic grant resources and their associated PUCCHs. This will cause waste of resources on the one hand, and on the other hand, it may also lead to inconsistent understanding between the terminal equipment and the network device, thereby causing that the network device erroneously scheduling resources, and further causing waste of resources.

Addressed to at least one of the above problems, embodiments of this disclosure provide a retransmission method and apparatus for sidelink transmission.

According to an aspect of the embodiments of this disclosure, there is provided a retransmission method for sidelink transmission, including:

receiving, by a terminal equipment, downlink control information (DCI) of which cyclic redundancy check (CRC) being scrambled by a sidelink configuration scheduling radio network temporary identifier (SL-CS-RNTI); and when a dynamic grant resource scheduled by the downlink control information is not used to transmit sidelink retransmission, transmitting indication information via a physical uplink control channel indicated by the downlink control information, the indication information indicating success of sidelink transmission or that a network device is not needed to schedule retransmission.

According to another aspect of the embodiments of this disclosure, there is provided a retransmission apparatus for sidelink transmission, including:

a receiving unit configured to receive downlink control information (DCI) of which cyclic redundancy check (CRC) being scrambled by a sidelink configuration scheduling radio network temporary identifier (SL-CS-RNTI); and a transmitting unit configured to, when a dynamic grant resource scheduled by the downlink control information is not used to transmit sidelink retransmission, transmit indication information via a physical uplink control channel indicated by the downlink control information, the indication information indicating success of sidelink transmission or that a network device is not needed to schedule retransmission.

According to a further aspect of the embodiments of this disclosure, there is provided a retransmission method for sidelink transmission, including:

receiving, by a terminal equipment, first downlink control information of which cyclic redundancy check being scrambled by a sidelink configuration scheduling radio network temporary identifier;

transmitting sidelink retransmission by using a first dynamic grant resource scheduled by the first downlink control information, and in a case where the first downlink control information indicates or provides a physical uplink control channel, transmitting indication information to a network device via the physical uplink control channel; and starting a timer when the indication information indicates failure of sidelink transmission or that the network device is needed to schedule retransmission.

According to still another aspect of the embodiments of this disclosure, there is provided a retransmission apparatus for sidelink transmission, including:

a receiving unit configured to receive first downlink control information of which cyclic redundancy check being scrambled by a sidelink configuration scheduling radio network temporary identifier;

a transmitting unit configured to transmit sidelink retransmission by using a first dynamic grant resource scheduled by the first downlink control information, and in a case where the first downlink control information indicates or provides a physical uplink control channel, transmit indication information to a network device via the physical uplink control channel; and a processing unit configured to start a timer when the indication information indicates failure of sidelink transmission or that the network device is needed to schedule retransmission.

According to yet another aspect of the embodiments of this disclosure, there is provided a retransmission method for sidelink transmission, including:

receiving, by a network device, indication information transmitted by a terminal equipment via a physical uplink control channel associated with a configured grant resource, the indication information being used for indicating failure of sidelink transmission or that a network device is needed to schedule retransmission; and transmitting downlink control information of which cyclic redundancy check being scrambled by a sidelink configuration scheduling radio network temporary identifier; wherein the downlink control information and a dynamic grant resource scheduled by the downlink control information are after the physical uplink control channel and before a next configured grant resource applicable to the same hybrid automatic repeat request process, and the downlink control information schedules sidelink retransmission of the hybrid automatic repeat request process.

According to yet still another aspect of the embodiments of this disclosure, there is provided a retransmission apparatus for sidelink transmission, including:

a receiving unit configured to receive indication information transmitted by a terminal equipment via a physical uplink control channel associated with a configured grant resource, the indication information being used for indicating failure of sidelink transmission or that a network device is needed to schedule retransmission; and a transmitting unit configured to transmit downlink control information of which cyclic redundancy check being scrambled by a sidelink configuration scheduling radio network temporary identifier; wherein the downlink control information and a dynamic grant resource scheduled by the downlink control information are after the physical uplink control channel and before a next configured grant resource applicable to the same hybrid automatic repeat request process, and the downlink control information schedules sidelink retransmission of the hybrid automatic repeat request process.

An advantage of the embodiments of this disclosure exists in that on the premise that the network device may schedule the dynamic grant resources for retransmission, by making the terminal equipment feed back ACK on the PUCCH associated with the dynamic grant resources having no data to be transmitted, or by allowing the terminal equipment to use the dynamic grant resources for retransmission or initial transmission (new transmission), or by restricting positions or use of the dynamic grant resources, it is possible to reduce or avoid waste of dynamic grant resources that have been scheduled by the network device, and prevent the network devices from erroneously scheduling the dynamic grant resources continuously.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

FIG. 10 is another schematic diagram of the sidelink resource configuration of the embodiment of this disclosure;

FIG. 11 is a further schematic diagram of the sidelink resource configuration of the embodiment of this disclosure;

FIG. 12 is still another schematic diagram of the retransmission method for sidelink transmission of the embodiment of this disclosure;

DETAILED DESCRIPTION

Figure 1:
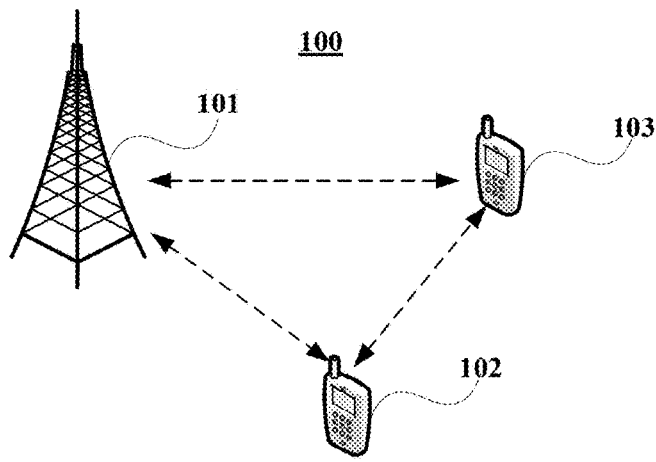
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. In this text, "a device" may refer to a network device, and may also refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiments of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between the two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiments of this disclosure, the terminal equipment 102 and/or the terminal equipment 103 may be allocated with sidelink resources by the network device (i.e. in mode 1). Of course, autonomous selection of sidelink resources (i.e. in mode 2) and allocation of sidelink resources by the network device (i.e. in mode 1) may be combined in the embodiments of this disclosure, which are not limited in the embodiments of this disclosure.

For the dynamic grant, the network device schedules sidelink resources via a physical downlink control channel (PDCCH), cyclic redundancy check (CRC) of the PDCCH being scrambled by a sidelink radio network temporary identifier (SL-RNTI).

For the configured grant, the network device configures periodic sidelink resources via radio resource control (RRC) signaling, and the terminal equipment may directly use the configured resources for PSSCH transmission, without needing to request the network device for sidelink resources via a scheduling request (SR). The terminal equipment may obtain feedback information (ACK/NACK) of the PSSCH by receiving a PSFCH, and transmit the ACK/NACK of the sidelink to the network device via the PUCCH. An occasion for transmitting the PUCCH may be configured via RRC in each period of the configured grant, and according to the ACK/NACK carried by the PUCCH, the network device may use the dynamic grant (via the PDCCH) to schedule retransmission resources, and may indicate PUCCH resources associated with the retransmission resources in the PDCCH, CRC of the PDCCH is scrambled by a sidelink configuration scheduling radio network temporary identifier (SL-CS-RNTI).

For the sake of simplicity, the PSSCH resources configured via the RRC in the configured grant are hereinafter referred to as configured grant resources, and the PSSCH resources scheduled by the network device in the configured grant are referred to as dynamic grant resources.

Figure 2:
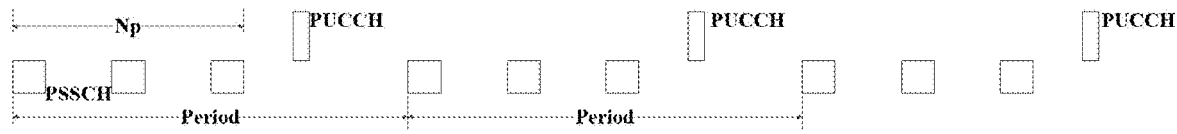
FIG. 2 is a schematic diagram of sidelink resource configuration of an embodiment of this disclosure.

FIG. 2 is a schematic diagram of the sidelink resource configuration of an embodiment of this disclosure. As shown in FIG. 2, let Np denote the number of resources configured by the network device in each period, that is, the number of times of transmission that may be accommodated in each period, and let Nmax indicate a maximum number of times of transmission of a transmission block (TB) allowed for the terminal equipment by using the configured grant resource, the number of times including a sum of the number of times of initial transmission and retransmission, and Nmax may be greater than Np.

If the configured grant does not configure a PUCCH resource, the network device is unable to schedule retransmission resources based on the ACK/NACK, hence, the retransmission may only use the configured grant resource. If the configured grant configures a PUCCH resource, the network device may schedule the retransmission by using the dynamic grant after receiving NACK transmitted by the terminal equipment (i.e. based on the NACK), that is, the retransmission of the configured grant may use the dynamic grant resource, and furthermore, the retransmission of the configured grant may also use the configured grant resource.

It was found by the inventors that for the configured grant configuring a PUCCH, when the retransmission may use the dynamic grant resource or the configured grant resource, it will occur that although the network device schedules the dynamic grant resource, no information is transmitted on the dynamic grant resource and its associated PUCCH. This will result in waste of resources on the one hand, and on the other hand, it will result in inconsistency of understandings between the terminal equipment and the network device, thereby causing that the network device schedules resources erroneously, and further resulting in waste of resources.

For example, before arrival of the dynamic grant resource scheduled by the base station, the terminal equipment has received ACK via the PSFCH, or the terminal equipment has reached the maximum number of times of transmission Nmax, and there is actually no information to be transmitted on the dynamic grant resource and its associated PUCCH.

If no information is transmitted, the dynamic grant resource will be wasted, and furthermore, the network device may determine the PUCCH feedback information as DTX, thereby continuously scheduling new dynamic grant resources for retransmission. Such erroneous propagation in scheduling will cause further waste of resources. The embodiments of this disclosure will provide corresponding solutions therefor.

In the embodiments of this disclosure, the sidelink is described by taking V2X as an example, however, this disclosure is not limited thereto, and it may also be applicable to sidelink transmission scenarios other than V2X. Furthermore, sidelink control information (SCI) is carried by a PSCCH, sidelink data are carried by a PSSCH, and sidelink feedback information is carried by a physical sidelink feedback channel (PSFCH).

In the following description, without causing confusion, the term "sidelink" and the term "V2X" are interchangeable, the term "PSFCH" and the term "sidelink feedback channel" are interchangeable, and the term "PSCCH" and the term "sidelink control channel" or "sidelink control information" are interchangeable, and the term "PSSCH" and the term "sidelink data channel" or "sidelink data" are interchangeable.

Furthermore, transmitting or receiving a PSSCH may be understood as transmitting or receiving sidelink data carried by a PSSCH, and transmitting or receiving a PSFCH may be understood as transmitting or receiving sidelink feedback information carried by a PSFCH. At least one time of transmission may be understood as at least one time of PSSCH/PSCCH transmission or at least one time of sidelink data/information transmission, and current transmission may be understood as current PSSCH/PSCCH transmission or current sidelink data/information transmission.

Embodiments of a First Aspect

The embodiments of this disclosure provide a retransmission method for sidelink transmission, which shall be described from a terminal equipment. The terminal equipment (which may be referred to as a transmitting terminal equipment), as a transmitter of service data, transmits sidelink data to one or more other terminal equipments (which may be referred to as receiving terminal equipments).

Figure 3:
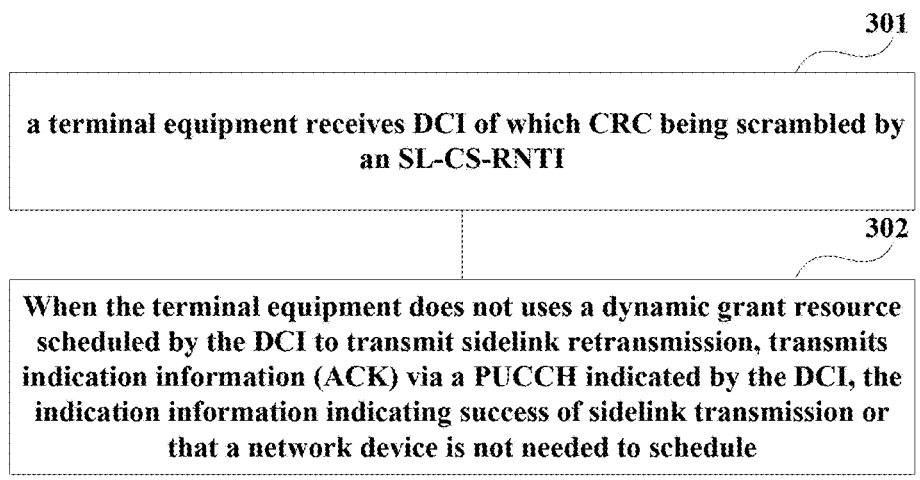
FIG. 3 is a schematic diagram of the retransmission method for sidelink transmission of an embodiment of this disclosure.

FIG. 3 is a schematic diagram of the retransmission method for sidelink transmission of the embodiment of this disclosure. As shown in FIG. 3, the method includes:

301: a terminal equipment receives DCI of which CRC being scrambled by an SL-CS-RNTI; and

302: when the terminal equipment does not uses a dynamic grant resource scheduled by the DCI to transmit sidelink retransmission, the terminal equipment transmits indication information (ACK) via a PUCCH indicated by the DCI, the indication information indicating success of sidelink transmission or that a network device is not needed to schedule retransmission.

It should be noted that FIG. 3 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 3.

In some embodiments, assuming that the terminal equipment is configured with configured grant resources and a PUCCH occasion by RRC signaling, configured grant resources in a period and a PUCCH with which the period is associated may be defined as a block. The network device may schedule a dynamic grant resource via the PDCCH, and indicate a PUCCH occasion with which the dynamic grant resource is associated in the PDCCH.

Figure 4:
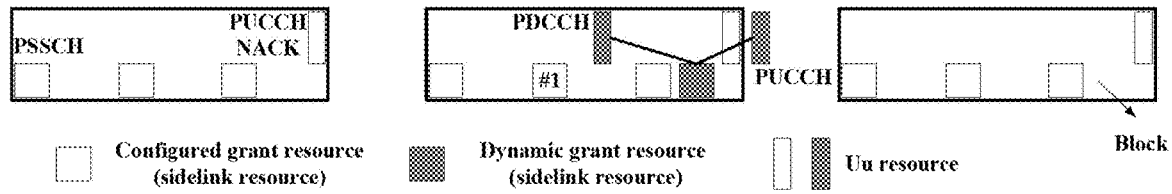
FIG. 4 is a schematic diagram of a PDCCH and dynamic grant resources of an embodiment of this disclosure.

FIG. 4 is a schematic diagram of the PDCCH and the dynamic grant resource of the embodiment of this disclosure, showing a case where the PDCCH and a corresponding dynamic grant resource are in the same block, but a PUCCH to which the dynamic grant resource corresponds is outside the block.

Figure 5:
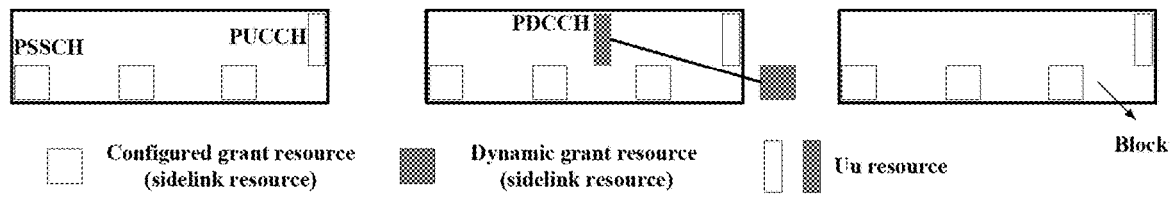
FIG. 5 is another schematic diagram of the PDCCH and dynamic grant resources of an embodiment of this disclosure.

FIG. 5 is another schematic diagram of the PDCCH and the dynamic grant resource of the embodiment of this disclosure, showing a case where the PDCCH is within a block, while a corresponding dynamic grant resource is outside the block.

Figure 6:
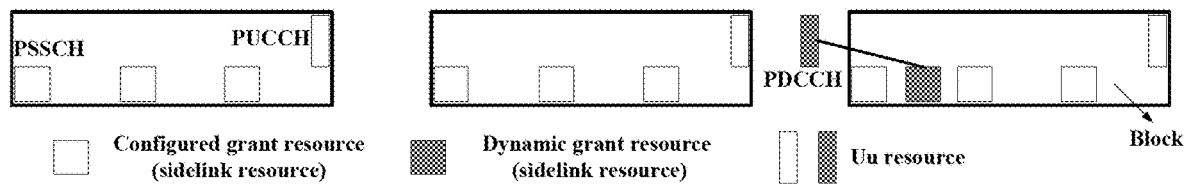
FIG. 6 is a further schematic diagram of the PDCCH and dynamic grant resources of an embodiment of this disclosure.

FIG. 6 is a further schematic diagram of the PDCCH and the dynamic grant resource of the embodiment of this disclosure, showing a case where the PDCCH is outside a block, while a corresponding dynamic grant resource is within the block.

FIGS. 4-6 schematically illustrate possible positions of the PDCCH and the dynamic grant resource. Without loss of generality, the PUCCH associated with the dynamic grant resource indicated by the PDCCH may be omitted in FIGS. 4-6, and the PSFCH is also omitted in FIGS. 4-6.

Periods in FIGS. 4-6 have (or may be used for) identical hybrid automatic repeat request (HARQ) process identity (process ID), periods with different HARQ process IDs are omitted in the figures, and only one HARQ process is exemplified in this text; and furthermore, FIGS. 4-6 only show that the PDCCH schedules one dynamic grant resource, which may be easily extended to cases where multiple dynamic grant resources are scheduled.

The HARQ process ID herein refers to, for example, an HARQ process ID indicated by SCI transmitted by the terminal equipment, and how the terminal equipment determines the HARQ process is not limited in this description.

For example, the terminal equipment may determine the above HARQ process ID to be equal to the HARQ process ID indicated by the DCI, or equal to an HARQ process ID determined by a time-frequency resource.

For another example, the terminal equipment may determine the HARQ process ID on its own, and maintain a one-to-one mapping relationship between the HARQ process ID and the HARQ process ID indicated by the DCI (or the HARQ process ID determined by the time-frequency resource), and if the terminal equipment learns the HARQ process ID indicated by the DCI (or the HARQ process ID determined by the time-frequency resource), the HARQ process ID indicated by the SCI may be inversely inferred.

In some embodiments, when the terminal equipment initiates initial transmission on a configured grant resource, it may use a configured grant resource within the same period for retransmission, and transmit ACK/NACK to the network device on a PUCCH with which the period is associated.

After receiving the NACK, the network device may use the PDCCH to schedule retransmission for the terminal equipment. It is not limited herein that the network device necessarily schedules retransmission after receiving the NACK. If the terminal equipment does not receive the PDCCH scheduling the retransmission, it may use the configured grant resources for retransmission; and if the terminal equipment receives the PDCCH scheduling the retransmission, it may use the dynamic grant resources scheduled by the PDCCH for retransmission, or may use the configured grant resources for retransmission.

As shown in FIGS. 4-6, the configured grant resources appear before the dynamic grant resources, and the network device does not learn ACK/NACK states of the configured grant resources. For example, in FIG. 4, the network device schedules the dynamic grant resources after receiving the NACK on the PUCCH; and as there exists no PUCCH reporting ACK/NACK of a configured grant resource #1, the network device is unable to know ACK/NACK state of the configured grant resource #1.

It is assumed that the following conditions are satisfied at the same time: the terminal equipment uses the configured grant resource #1 for retransmission; the terminal equipment receives ACK for the configured grant resource #1 via the PSFCH, or the terminal equipment has reached a maximum number of times for transmission by using the configured grant resources at this time; and the terminal equipment has no new TB needing to be transmitted, that is, it has no initial transmission (or new transmission). In this case, the terminal equipment may choose not to transmit any information on the dynamic grant resources and their associated PUCCHs. As the terminal equipment neither feeds back NACK nor ACK, the network device may possibly determine that it is DTX, and may continue to schedule and allocate dynamic grant resources for retransmission, thereby causing unnecessary waste of resources.

In the embodiments of this disclosure, when the terminal equipment uses the configured grant to perform sidelink transmission, if the terminal equipment does not perform transmission on the retransmission resources scheduled by the network device, the terminal equipment transmits ACK on the PUCCH with which the retransmission resources are associated.

Hence, as the terminal equipment transmits the ACK to the network device, the network device will not schedule the retransmission after receiving the ACK, thereby avoiding inconsistency in understandings between the terminal equipment and the network device, and preventing waste of resources resulted from erroneously scheduling the retransmission by the network device.

In some embodiments, for the same HARQ process, before arrival of a time of the dynamic grant resource, in the case where the terminal equipment has received the indication information (ACK) for indicating that the sidelink is successfully transmitted, the terminal equipment does not use the dynamic grant resource to transmit the sidelink retransmission.

For example, before the dynamic grant resource, the terminal equipment has received the ACK and has no new transmission, and the terminal equipment may not perform transmission on the dynamic grant resource, and may transmit the ACK on the PUCCH with which the dynamic grant resource is associated.

In some embodiments, for the same HARQ process, before arrive of a time of the dynamic grant resource, the terminal equipment does not use the dynamica grant resource to transmit the sidelink retransmission in a case where the terminal equipment has reached the maximum number of times of transmission by using the configured grant resource.

For example, before the dynamic grant resource, the terminal equipment has reached the maximum number of times of transmission by using the configured grant resource and has no new transmission, and the terminal equipment may not perform transmission on the dynamic grant resource, and may transmit the ACK on the PUCCH with which the dynamic grant resource is associated.

In some embodiments, the terminal equipment transmits indication information (NACK) to the network device on the PUCCH with which the configured grant resource is associated, wherein the indication information (NACK) is for indicating that the sidelink transmission fails or that the network device is needed to schedule retransmission. Thus, the network device transmits the DCI with the CRC being scrambled by the SL-CS-RNTI to the terminal equipment according to the NACK.

In some embodiments, the terminal equipment may also use the dynamic grant resource scheduled by the DCI to transmit the initial transmission of the sidelink, and transmit the indication information (NACK or ACK) indicating whether the transmission of the sidelink is successful or whether the network device is needed to schedule retransmission on the physical uplink control channel indicated by the DCI.

For example, assuming that the terminal equipment has received the ACK before the dynamic grant resource, or the terminal equipment has reached the maximum number of times of transmission by using the configured grant resource, the terminal equipment may just have a new TB to be transmitted at this moment, that is, it has new transmission. The terminal equipment may transmit the new transmission by using the dynamic grant resource in this case, thereby avoiding waste of the dynamic grant resource.

Figure 7:
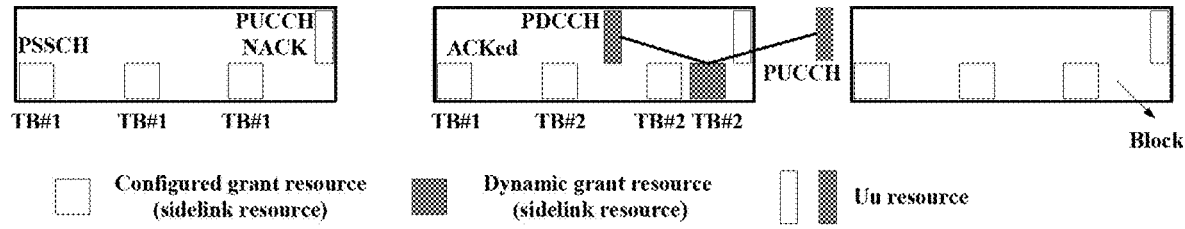
FIG. 7 is a schematic diagram of sidelink resource configuration of an embodiment of this disclosure.

FIG. 7 is a schematic diagram of the sidelink resource configuration of the embodiment of this disclosure. As shown in FIG. 7, what is originally scheduled by the PDCCH is retransmission of TB #1, and as TB #1 has been successfully transmitted before the retransmission (as shown by ACKed in the middle part), the retransmission resource is used for transmitting TB #2.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that on the premise that the network device may schedule the dynamic grant resources for retransmission, by making the terminal equipment feed back ACK on the PUCCH associated with the dynamic grant resources having no data to be transmitted, or by allowing the terminal equipment to use the dynamic grant resources for retransmission or initial transmission (new transmission), it is possible to reduce or avoid waste of dynamic grant resources that have been scheduled by the network device, and prevent the network devices from erroneously scheduling the dynamic grant resources continuously.

Embodiments of a Second Aspect

The embodiments of this disclosure provide a retransmission method for sidelink transmission, which shall be described from a terminal equipment. The terminal equipment (which may be referred to as a transmitting terminal equipment), as a transmitter of service data, transmits sidelink data to one or more other terminal equipments (which may be referred to as receiving terminal equipments). The embodiments of the second aspect may be implemented independently, or may be combined with the embodiments of the first aspect, with contents identical to those in the embodiments of the first aspect being not going to be described herein any further.

In some embodiments, although the terminal equipment reaches the maximum number of times of transmission by using the configured grant resource before the dynamic grant resource, as the dynamic grant resource may not affect and occupy the configured grant resource, the terminal equipment may also choose to use the dynamic grant resource to transmit retransmission. The maximum number of times of transmission by using the dynamic grant resource is determined by the network device, and is dependent on implementation of the network device.

Therefore, even if the terminal equipment reaches the maximum number of times of transmission by using the configured grant resource before the dynamic grant resource, the terminal equipment may be let continue to use the dynamic grant resource for retransmission, thereby avoiding waste of the dynamic grant resource; however, there may exist a problem that a buffer is unable to be flushed, resulting in that the HARQ process is blocked.

For example, the network device has also reached the maximum number of times of transmission by using the dynamic grant resource, that is, the network device will no longer schedule retransmissions of an HARQ process, and a buffer of the HARQ process of the terminal equipment will not be flushed, so that the HARQ process is blocked. This means that all configured grant resources with which a process ID of the HARQ process is associated may no longer be used, which is a huge waste of configured grant resources.

Even if the network device may flush the buffer by scheduling new transmission, whether the network device is able to schedule the new transmission is dependent on whether the terminal equipment has an SR that is triggered, and whether the buffer is able to be flushed is dependent on whether the new transmission is able to be successfully transmitted. Such restrictions make the method unable to solve the problem that the buffer is unable to be flushed.

Figure 8:
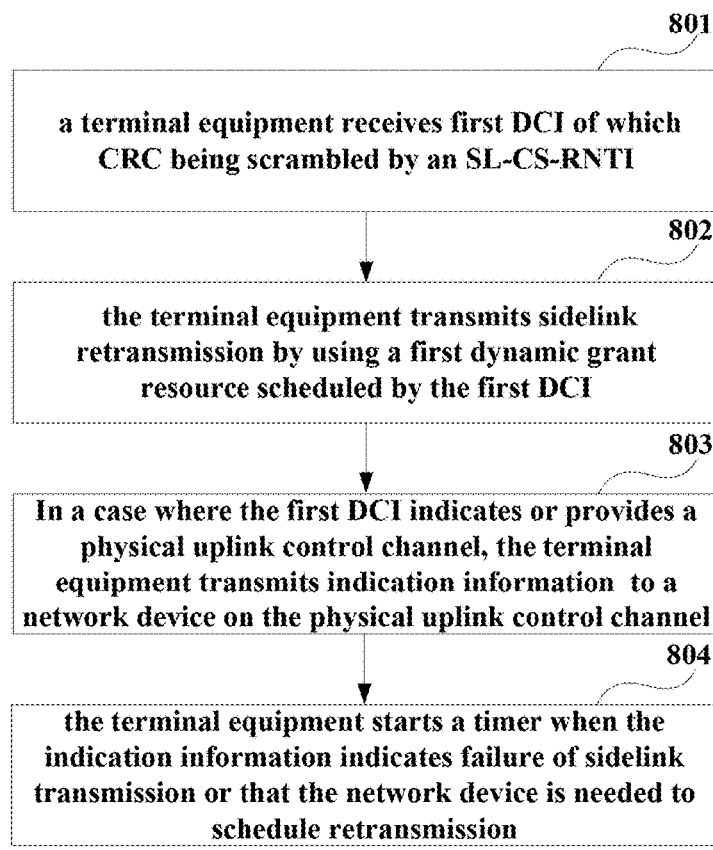
FIG. 8 is another schematic diagram of the retransmission method for sidelink transmission of the embodiment of this disclosure.

FIG. 8 is another schematic diagram of the retransmission method for sidelink transmission of the embodiment of this disclosure. As shown in FIG. 8, the method includes:

801: a terminal equipment receives first DCI of which CRC being scrambled by an SL-CS-RNTI;

802: the terminal equipment transmits sidelink retransmission by using a first dynamic grant resource scheduled by the first DCI;

803: in a case where the first DCI indicates or provides a physical uplink control channel, the terminal equipment transmits indication information to a network device on the physical uplink control channel; and

804: the terminal equipment starts a timer when the indication information indicates failure of sidelink transmission or that the network device is needed to schedule retransmission.

Therefore, the terminal equipment starts the timer after transmitting NACK, the timer being used to prevent the terminal equipment from never flushing a buffer. The terminal equipment does not flush the buffer during operation of the timer, but may flush the buffer after the timer expires, thereby solve a problem that the buffer is unable to be flushed.

Figure 9:
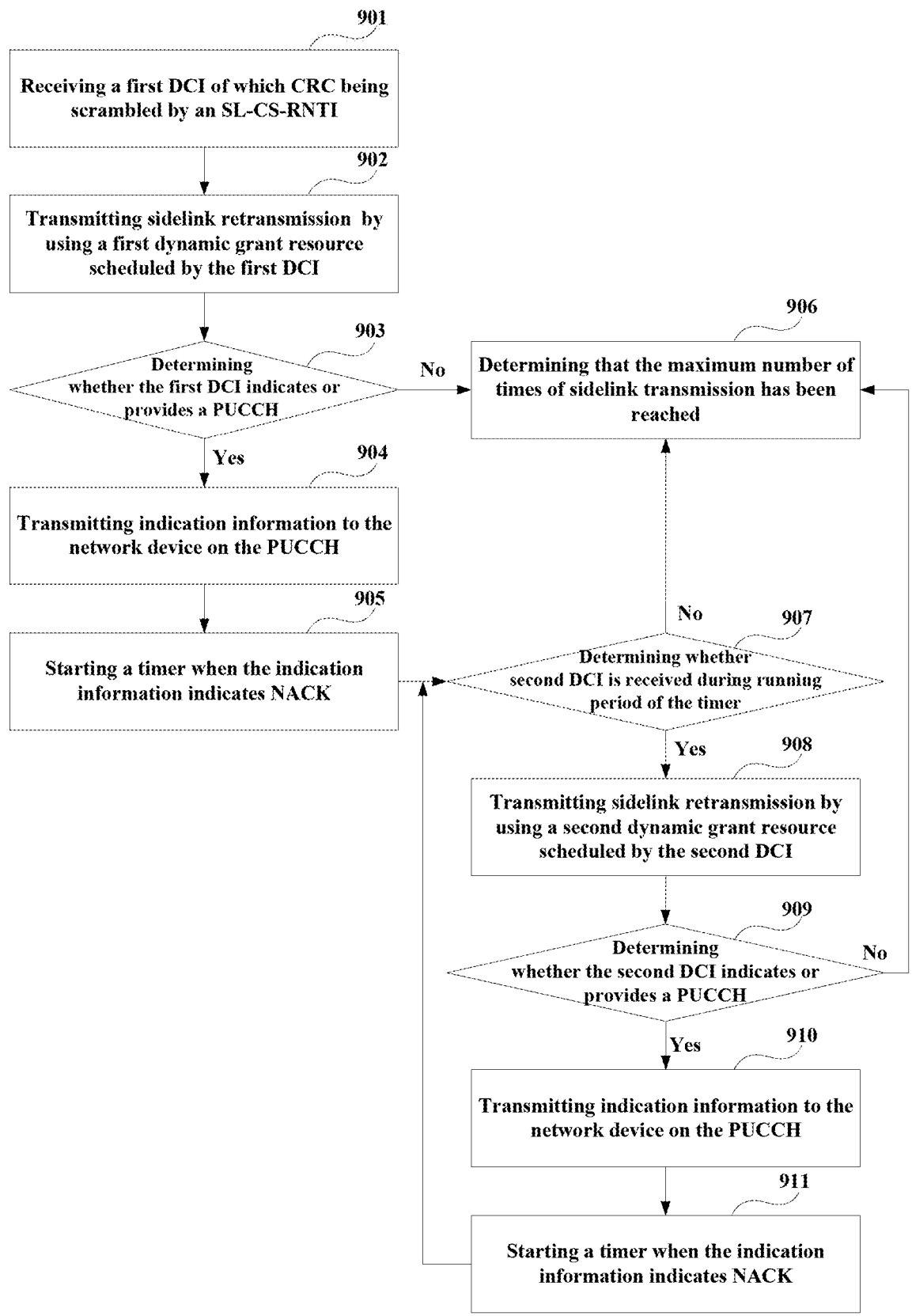
FIG. 9 is a further schematic diagram of the retransmission method for sidelink transmission of the embodiment of this disclosure.

FIG. 9 is a further schematic diagram of the retransmission method for sidelink transmission of the embodiment of this disclosure. As shown in FIG. 9, the method includes:

901: a terminal equipment receives a first DCI of which CRC being scrambled by an SL-CS-RNTI;

902: the terminal equipment transmits sidelink retransmission by using a first dynamic grant resource scheduled by the first DCI;

903: the terminal equipment determines whether the first DCI indicates or provides a physical uplink control channel, executing 904 if yes, and executing 906 if no;

904: the terminal equipment transmits indication information to the network device on the physical uplink control channel; and

905: the terminal equipment starts a timer when the indication information indicates failure of sidelink transmission or that the network device is needed to schedule retransmission (NACK).

In some embodiments, in a case where the first DCI schedules a plurality of first dynamic grant resources and the plurality of first dynamic grant resources are associated with a plurality of physical uplink control channels, the timer is started after a last physical uplink control channel in the plurality of physical uplink control channels.

As shown in FIG. 9, the method may further include:

906: the terminal equipment determines that the maximum number of times of sidelink transmission has been reached.

In some embodiments, when the PDCCH indicates that there exists no PUCCH resource, it means that the network device no longer intends to continue scheduling the retransmission, it is because that the terminal equipment is unable to transmit ACK/NACK to the network device at this moment, and the network device is unable to schedule the retransmission based on the NACK. Hence, the terminal equipment may deem that the maximum number of times of transmission has been reached. Reaching the maximum number of times of transmission here means that the terminal equipment may neither use the configured grant resource for retransmission nor use the dynamic grant resource for retransmission. Thus, the terminal equipment has the freedom of flushing the buffer and may use the buffer for new transmission.

In some embodiments, reaching the maximum number of times of sidelink transmission is equivalent to flushing the buffer.

As shown in FIG. 9, the method may further include:

907: the terminal equipment determines whether second DCI of which CRC being scrambled by an SL-CS-RNTI is received during running period of the timer, executing 908 if yes, and executing 906 if no.

In some embodiments, if the terminal equipment does not receive the retransmission scheduling of the network device during the running period of the timer, it means that the network device decides not to schedule the terminal equipment for retransmission, hence, the terminal equipment has the freedom to flush the buffer after the timer expires, and may use the buffer for new transmission.

As shown in FIG. 9, the method may further include:

908: the terminal equipment transmits sidelink retransmission by using a second dynamic grant resource scheduled by the second DCI;

909: the terminal equipment determines whether the second DCI indicates or provides a physical uplink control channel, executing 910 if yes, and executing 906 if no;

910: the terminal equipment transmits indication information to the network device on the physical uplink control channel; and

911: the terminal equipment starts a timer when the indication information indicates failure of sidelink transmission or that the network device is needed to schedule retransmission (NACK).

In some embodiments, when the second DCI schedules multiple second dynamic grant resources and the multiple second dynamic grant resources are associated with multiple physical uplink control channels, the timer is started after a last physical uplink control channel of the multiple physical uplink control channels.

It should be noted that FIGS. 8 and 9 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIGS. 8 and 9.

In some embodiments, before a moment of the first dynamic grant resource arrives, the terminal equipment has reached the maximum number of times of transmission by using the configured grant resource.

For example, the terminal equipment reaches the maximum number of times of transmission by using the configured grant resource before the dynamic grant resource arrives, the terminal equipment has no new transmission, and in order to avoid waste of dynamic grant resources, the terminal equipment may use the dynamic grant resource to transmit retransmission.

As the terminal equipment has reached the maximum number of times of transmission by using the configured grant resource, the terminal equipment will not use the configured grant resource to transmit retransmission, and subsequent retransmission of the terminal equipment may only be scheduled by the network device. Denoting the PDCCH that schedules the dynamic grant resource as PDCCH #1, PDCCH #1 may indicate a PUCCH #1 resource associated with the dynamic grant resource, or may indicate that there exists no PUCCH resource.

When PDCCH #1 indicates that there exists no PUCCH resource, the terminal equipment does not transmit ACK/NACK to the network device, and the network device is unable to schedule retransmission based on the ACK/NACK. This means that the network device no longer intends to continue scheduling retransmission, hence, the terminal equipment may deem that the maximum number of times of transmission has been reached. Reaching the maximum number of times of transmission here means that the terminal equipment may neither use the configured grant resource for retransmission nor use the dynamic grant resource for retransmission. Therefore, the terminal equipment has the freedom to flush the buffer, and may use the buffer for new transmission.

When PDCCH #1 indicates PUCCH #1, the terminal equipment transmits ACK/NACK of dynamic grant resource on PUCCH #1, and starts the timer after transmitting NACK. The timer is used to prevent the terminal equipment from never flushing the buffer. The terminal equipment does not flush the buffer while the timer is running, but may flush the buffer after the timer expires.

If the terminal equipment does not receive the retransmission scheduling from the network device during the running period of the timer, it means that the network device decides not to schedule the terminal equipment to perform retransmission, hence, the terminal equipment has the freedom to flush the buffer after the timer expires, and may use the buffer for new transmission.

If the terminal equipment receives PDCCH #2 scheduled for retransmission by the network device during the running period of the timer, the terminal equipment transmits the retransmission on a dynamic grant resource indicated by PDCCH #2. When PDCCH #2 indicates PUCCH #2, the terminal equipment transmits ACK/NACK of the dynamic grant resource on PUCCH #2, and restarts the timer after transmitting NACK.

Thereafter, the terminal equipment repeats the previous process of monitoring the retransmission scheduled by the network device during the running period of the timer. When PDCCH #2 indicates that there exists no PUCCH resource, the terminal equipment deems that the maximum number of times of transmission has been reached, the terminal equipment has the freedom to flush the buffer, and may use the buffer for new transmission.

FIG. 10 is another schematic diagram of the sidelink resource configuration of the embodiment of this disclosure. As shown in FIG. 10, it is assumed that the terminal equipment transmits NACK to the network device after retransmission #2 of TB1, before receiving the retransmission scheduling of the network device, retransmission #3 has been transmitted by using the configured grant resource, and the maximum number of times of transmission by using the configured grant resource has been reached at retransmission #3.

Thereafter, the terminal equipment receives PDCCH #1 scheduled for retransmission, transmits retransmission #4 on the scheduled dynamic grant resource, transmits NACK on its associated PUCCH #1, and starts the timer. During the running period of the timer, if the terminal equipment does not receive the retransmission scheduling, the terminal equipment deems that the maximum number of times of transmission of TB1 has been reached. When the terminal equipment needs to transmit TB2, an HARQ process ID #n and its buffer may be used for TB2.

In some embodiments, the terminal equipment does not use the configured grant resource to transmit the sidelink retransmission after transmitting the indication information (NACK) to the network device on the physical uplink control channel with which the configured grant resource is associated, wherein the indication information (NACK) indicates a failure of the sidelink transmission or that the network device is needed to schedule the retransmission.

For example, the terminal equipment uses the configured grant resource to transmit initial transmission and a number of times of retransmission, and then transmits NACK on the PUCCH with which the configured grant resource is associated. After transmitting the NACK, the terminal equipment transmits the retransmission only on the dynamic grant resource scheduled by the network device, and does not transmit the retransmission by using the configured grant resource. The terminal equipment starts the timer after transmitting NACK, and a function of the timer is similar to that described above, which shall not be described herein any further.

If the terminal equipment does not receive the retransmission scheduling of the network device during the running period of the timer, the terminal equipment deems that the maximum number of times of transmission has been reached. If the terminal equipment receives the PDCCH of retransmission scheduling of the network device during the running period of the timer, the terminal equipment transmits the retransmission on the resource scheduled by the PDCCH. When the PDCCH indicates the PUCCH, the terminal equipment transmits ACK/NACK on the PUCCH, and restarts the timer after transmitting NACK. Thereafter, the terminal equipment repeats the previous process of monitoring the retransmission scheduled by the network device during the running period of the timer. When the PDCCH indicates that there exists no PUCCH resource, the terminal equipment deems that the maximum number of times of transmission has been reached.

FIG. 11 is a further schematic diagram of the sidelink resource configuration of the embodiment of this disclosure. As shown in FIG. 11, the terminal equipment transmits NACK to the network device after retransmission #2, and then transmits retransmission #3 on the resource scheduled by the network device.

In some embodiments, the timer is started or restarted in at least one of the following cases that:
the terminal equipment receives DCI used for scheduling retransmission;
the terminal equipment transmits a physical sidelink shared channel (PSSCH) scheduled by the DCI; or
the terminal equipment transmits a physical uplink control channel indicated by the DCI.

In some embodiments, a time length of the timer is semi-statically configured or dynamically determined.

In some embodiments, the time length of the timer starts from after a time domain position of a physical uplink control channel indicated by DCI or a time domain position of a physical uplink control channel associated with a configured grant resource, and ends before a time domain position of a physical uplink control channel associated with a next configured grant resource applicable to identical hybrid automatic repeat request (HARQ) processes.

For example, the timer starts after the PUCCH with which the dynamic grant resource is associated and ends before a PUCCH with which a next configured grant resource available for identical HARQ process IDs is associated.

As shown in FIG. 10, the timer runs between PUCCH #n1 and PUCCH #n3. A PDCCH received after PUCCH #n3 will be retransmission scheduling for PUCCH #n3 feedback, instead of retransmission scheduling for PUCCH #n1, hence, the time length of the timer may be limited to before PUCCH #n3.

In addition, as a position of PUCCH #n1 is scheduled by the network device, a time interval between PUCCH #n1 and PUCCH #n3 is variable, that is, the time length of the timer is variable. Each time the terminal equipment starts or restarts the timer, a different timer length may be used.

As shown in FIG. 11, the timer starts after the PUCCH (PUCCH #1) with which the configured grant resource is associated, and ends before a PUCCH (PUCCH #2) with which the next configured grant resource available for identical HARQ process IDs is associated.

In some embodiments, the time length of the timer is configured to be of a predetermined value or infinity.

For example, the length of the timer may be infinite. When the length of the timer is infinite, it is equivalent to that the timer does not work, and the terminal equipment deems that the maximum number of times of sidelink transmission is reached only when the terminal equipment receives the PDCCH scheduling the retransmission and the PDCCH indicates that there exists no PUCCH.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the dynamic grant resources are fully utilized, and the problem that the buffer is unable to be flushed is also solved, thereby avoiding waste of dynamic grant resources and configured grant resources.

Embodiments of a Third Aspect

The embodiments of this disclosure provide a retransmission method for sidelink transmission, which shall be described from a network device and a terminal equipment. The terminal equipment (which may be referred to as a transmitting terminal equipment), as a transmitter of service data, transmits sidelink data to one or more other terminal equipments (which may be referred to as receiving terminal equipments). The embodiments of the third aspect may be implemented independently, or may be combined with the embodiments of the first and second aspects, with contents identical to those in the embodiments of the first and second aspects being not going to be described herein any further.

One of reasons for the above-described waste of resources and inconsistent understandings between the terminal equipment and the network device is that the configured grant resource appears before the dynamic grant resource, but the network device does not learn an ACK/NACK state of the configured grant resource, as shown in FIGS. 4-6. Therefore, the above problems may be avoided by restricting a position of the dynamic grant resource.

FIG. 12 is still another schematic diagram of the retransmission method for sidelink transmission of the embodiment of this disclosure. As shown in FIG. 12, the method includes:

1201: a network device receives indication information (NACK) transmitted by a terminal equipment at a PUCCH associated with a configured grant resource, the indication information being used for indicating failure of sidelink transmission or that the network device is needed to schedule retransmission; and 1202: the network device transmits DCI of which CRC being scrambled by an SL-CS-RNTI; wherein the DCI and a dynamic grant resource scheduled by the DCI are after the PUCCH and before a next configured grant resource applicable to identical HARQ process, and the DCI schedules sidelink retransmission of the HARQ process.

In some embodiments, the terminal equipment expects or determines to receive the DCI of which CRC being scrambled by an SL-CS-RNTI and transmit sidelink retransmission on the dynamic grant resource scheduled by the DCI, after the PUCCH and before the next configured grant resource applicable to identical HARQ process; wherein the DCI schedules the sidelink retransmission of the HARQ process.

It should be noted that FIG. 12 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 12.

For example, after transmitting NACK on the PUCCH with which the configured grant resource is associated, the terminal equipment monitors the PDCCH scheduled by the network device for retransmission of identical HARQ process within a time window before the next configured grant resource available for identical HARQ process ID.

Within the above time window, the terminal equipment may possibly receive the retransmission scheduling of the network device, or may possibly not receive the retransmission scheduling of the network device. If the terminal equipment receives the retransmission scheduling of the network device, the retransmission scheduling PDCCH and the retransmission resource scheduled by the PDCCH are both located within the time window. In other words, for the same HARQ process, the network device may only transmit the PDCCH scheduled for retransmission within the time window, and the retransmission resource scheduled by the network device should also be located within the time window.

Figure 13:
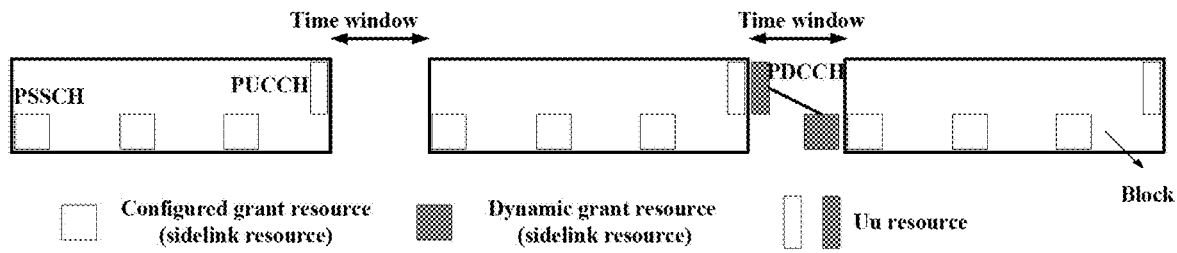
FIG. 13 is still another schematic diagram of the sidelink resource configuration of the embodiment of this disclosure.

FIG. 13 is still another schematic diagram of the sidelink resource configuration of the embodiment of this disclosure. As shown in FIG. 13, a PUCCH is before and most close to the PDCCH and the dynamic grant resource scheduled by the PDCCH, instead of the configured grant resource.

With the PUCCH, the network device may always learn the ACK/NACK state of the configured grant resource prior to the dynamic grant. The network device schedules the dynamic grant resource only at NACK. Therefore, the dynamic grant resource scheduled by the network device may always be used for transmitting retransmission, and there will be no waste of dynamic grant resources.

Figure 14:
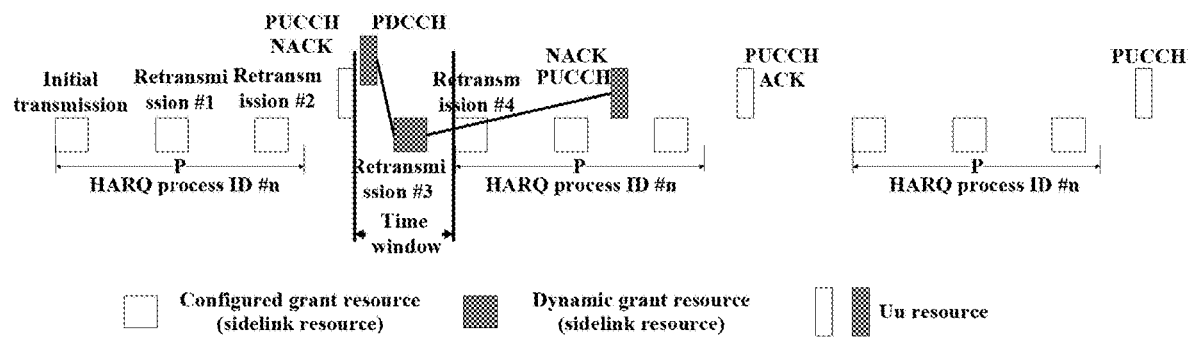
FIG. 14 is yet another schematic diagram of the sidelink resource configuration of the embodiment of this disclosure.

FIG. 14 is yet another schematic diagram of the sidelink resource configuration of the embodiment of this disclosure. As shown in FIG. 14, the terminal equipment uses the dynamic grant resource to transmit retransmission #3, receives ACK at retransmission #4 or reaches the maximum number of times of transmission by using the grant resource, and transmits the ACK to the network device on the PUCCH with which the period is associated. The network device will not transmit the PDCCH scheduling retransmission after receiving the ACK.

It can be seen from the above embodiments that waste of the dynamic grant resource scheduled by the network device may be effectively avoided.

Embodiments of a Fourth Aspect

The embodiments of this disclosure provide a retransmission method for sidelink transmission, which shall be described from a terminal equipment. The terminal equipment (which may be referred to as a transmitting terminal equipment), as a transmitter of service data, transmits sidelink data to one or more other terminal equipments (which may be referred to as receiving terminal equipments). The embodiments of the fourth aspect may be implemented independently, or may be combined with the embodiments of the first to the third aspects, with contents identical to those in the embodiments of the first to the third aspects being not going to be described herein any further.

In the configured grant of the sidelink, the network device autonomously decides the maximum number of times of transmission by using the dynamic grant resource. If more than one TBs are allowed to be transmitted in a period, the network device will not learn that a new TB is to be transmitted, and thus will not re-count the number of times of transmission, resulting in confusion of count of retransmissions.

For example, in a period, the terminal equipment transmits TB #1 and receives ACK via a PSFCH, then the terminal equipment transmits TB #2 and receives NACK on the PSFCH. The terminal equipment will transmit NACK to the network device on the PUCCH with which the period is associated. When the network device receives the NACK, it will deem it as NACK for TB #1, but does not learn that the terminal equipment has newly initiated transmission of TB #2. If the network device schedules retransmission again, the number of times of scheduling retransmission of TB #1 is increased by 1.

Therefore, the network device should stop counting the number of times of scheduling retransmission for TB #1 and start to count the number of times of scheduling retransmission for TB #2. In this way, the network device may accurately learn the actual number of times of retransmission of each TB, so that it may more reasonably decide the number of times of scheduling retransmission, thereby achieving effective utilization of resources.

In some embodiments, the terminal equipment uses a configured grant resource for sidelink transmission, one or more configured grant resources are associated with a physical uplink control channel, and the terminal equipment transmits at most one transport block (TB) in a period including the one or more configured grant resources and the physical uplink control channel.

With the above embodiments, the network device may more accurately determine the number of times of scheduling retransmission, thereby more effectively utilizing resources.

Embodiments of a Fifth Aspect

The embodiments of this disclosure provide a retransmission apparatus for sidelink transmission. The apparatus may be, for example, a terminal equipment (such as the terminal equipment as described above), or may be one or more components or assemblies configured in a terminal equipment. Contents in the embodiments identical to those in the embodiments of the first aspect shall not be described herein any further.

Figure 15:
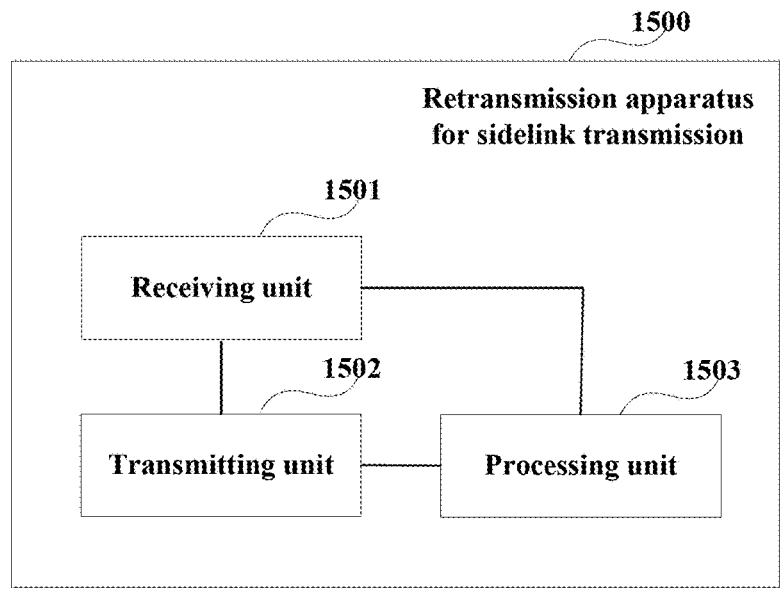
FIG. 15 is a schematic diagram of the retransmission apparatus for sidelink transmission of an embodiment of this disclosure.

FIG. 15 is a schematic diagram of the retransmission apparatus for sidelink transmission of the embodiment of this disclosure. In some embodiments, as shown in FIG. 15, the retransmission apparatus 1500 for sidelink transmission includes:
a receiving unit 1501 configured to, receive downlink control information (DCI) of which cyclic redundancy check (CRC) being scrambled by a sidelink configuration scheduling radio network temporary identifier (SL-CS-RNTI); and
a transmitting unit 1502 configured to, when a dynamic grant resource scheduled by the downlink control information is not used to transmit sidelink retransmission, transmit indication information via a physical uplink control channel indicated by the downlink control information, the indication information indicating success of sidelink transmission or that a network device is not needed to schedule retransmission.

In some embodiments, for the same hybrid automatic repeat request process, before a time of the dynamic grant resource arrives, in a case where indication information indicating success of sidelink transmission is received, the transmitting unit 1502 does not use the dynamic grant resource to transmit the sidelink retransmission.

In some embodiments, for the same hybrid automatic repeat request process, before a time of the dynamic grant resource arrives, in a case where a maximum number of times of transmission performed by using a configured grant resource is reached, the transmitting unit 1502 does not use the dynamic grant resource to transmit the sidelink retransmission.

In some embodiments, the transmitting unit 1502 is further configured to: at a physical uplink control channel associated with a configured grant resource, transmit indication information to the network device, the indication information indicating failure of sidelink transmission or that the network device is needed to schedule retransmission.

In some embodiments, as shown in FIG. 15, the retransmission apparatus 1500 for sidelink transmission includes: a receiving unit 1501 and a transmitting unit 1502, and furthermore, it may include a processing unit 1503.

The receiving unit 1501 receives first downlink control information of which cyclic redundancy check being scrambled by a sidelink configuration scheduling radio network temporary identifier, the transmitting unit 1502 transmits sidelink retransmission by using a first dynamic grant resource scheduled by the first downlink control information, and in a case where the first downlink control information indicates or provides a physical uplink control channel, transmits indication information to a network device via the physical uplink control channel, and the processing unit 1503 starts a timer when the indication information indicates failure of sidelink transmission or that the network device is needed to schedule retransmission.

In some embodiments, the processing unit 1503 is further configured to, before a time of the first dynamic grant resource arrives, determine that a terminal equipment reaches a maximum number of times of transmission performed by using a configured grant resource.

In some embodiments, the transmitting unit 1502 does not use a configured grant resource to transmit sidelink retransmission after transmitting the indication information indicating failure of sidelink transmission or that the network device is needed to schedule retransmission at a physical uplink control channel associated with a configured grant resource.

In some embodiments, the processing unit 1503 is further configured to, when the first downlink control information indicates that there does not exist or does not provide a physical uplink control channel, determine that the terminal equipment reaches a maximum number of times of sidelink transmission.

In some embodiments, in a case where the first downlink control information schedules a plurality of first dynamic grant resources and the plurality of first dynamic grant resources are associated with a plurality of physical uplink control channels, the timer is started after a last physical uplink control channel in the plurality of physical uplink control channels.

In some embodiments, the receiving unit 1501 is further configured to: during running period of the timer, receive second downlink control information of which cyclic redundancy check being scrambled by a sidelink configuration scheduling radio network temporary identifier.

In some embodiments, the transmitting unit 1502 is further configured to: in a case where the receiving unit 1501 receives the second downlink control information during running period of the timer, use a second dynamic grant resource scheduled by the second downlink control information to transmit sidelink retransmission.

In some embodiments, the processing unit 1503 is further configured to: in a case where the receiving unit 1501 receives the second downlink control information during running period of the timer and the second downlink control information indicates that there does not exist or does not provide a physical uplink control channel, determine that the terminal equipment reaches the maximum number of times of sidelink transmission.

In some embodiments, the transmitting unit 1502 is further configured to, in a case where the receiving unit 1501 receives the second downlink control information during running period of the timer and the second downlink control information indicates or provides a physical uplink control channel, transmit indication information to the network device via the physical uplink control channel;

and the processing unit 1503 is further configured to: start or restart the timer in a case where the indication information indicates failure of the sidelink transmission or that the network device is needed to schedule retransmission.

In some embodiments, in a case where the second downlink control information schedules a plurality of second dynamic grant resources and the plurality of second dynamic grant resources are associated with a plurality of physical uplink control channels, the timer is started or restarted after the last physical uplink control channel in the plurality of physical uplink control channels.

In some embodiments, the timer is started or restarted in at one of the following cases where:

a terminal equipment receives DCI used for scheduling retransmission;

the terminal equipment transmits a physical sidelink shared channel (PSSCH) scheduled by the DCI; or the terminal equipment transmits a physical uplink control channel indicated by the DCI.

In some embodiments, a time length of the timer is semi-statically configured or dynamically determined.

In some embodiments, a time length of the timer starts from after a time domain position of a physical uplink control channel indicated by downlink control information or a time domain position of a physical uplink control channel associated with a configured grant resource, and ends before a time domain position of a physical uplink control channel associated with a next configured grant resource applicable to the same hybrid automatic repeat request process.

In some embodiments, the time length of the timer is configured to be of a predetermined value or infinity.

In some embodiments, the transmitting unit 1502 is further configured to: transmit indication information indicating a failure of the sidelink transmission or that the network device is needed to schedule retransmission on the physical uplink control channel associated with the configuration grant resource, and the processing unit 1503 expects or determines to receive downlink control information of which cyclic redundancy check being scrambled by a sidelink configuration scheduling radio network temporary identifier and transmit the sidelink retransmission on the dynamic grant resource scheduled by the downlink control information, after the physical uplink control channel and before the next configured grant resource applicable to the same hybrid automatic repeat request process, wherein the downlink control information schedules the sidelink retransmission of the hybrid automatic repeat request process.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the retransmission apparatus 1500 for sidelink transmission may further include other components or modules, and reference may be made to related techniques for particulars of these components or modules.

Furthermore, for the sake of simplicity, connection relationships between the components or modules or signal profiles thereof are only illustrated in FIG. 15. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that on the premise that the network device may schedule the dynamic grant resources for retransmission, by making the terminal equipment feed back ACK on the PUCCH associated with the dynamic grant resources having no data to be transmitted, or by allowing the terminal equipment to use the dynamic grant resources for retransmission or initial transmission (new transmission), it is possible to reduce or avoid waste of dynamic grant resources that have been scheduled by the network device, and prevent the network devices from erroneously scheduling the dynamic grant resources continuously.

Embodiments of a Sixth Aspect

The embodiments of this disclosure provide a communication system, and reference may be made to FIG. 1, with contents identical to those in the embodiments of the first to the fifth aspects being not going to be described herein any further.

The embodiment of this disclosure further provides a network device, which may be, for example, a base station. However, this disclosure is not limited thereto, and it may also be another network device.

Figure 16:
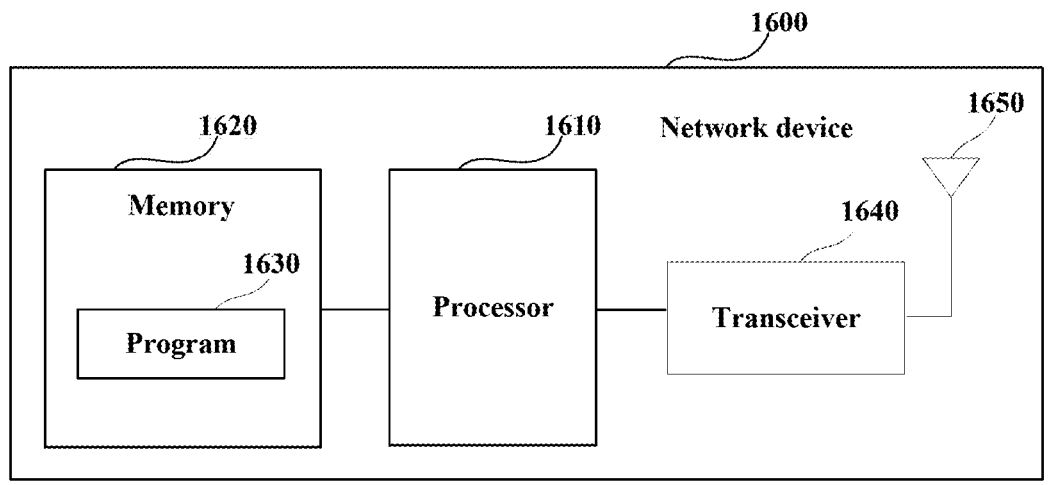
FIG. 16 is a schematic diagram of the network device of an embodiment of this disclosure.

FIG. 16 is a schematic diagram of the network device of the embodiment of this disclosure. As shown in FIG. 16, the network device 1600 may include a processor 1610 (such as a central processing unit (CPU)) and a memory 1620, the memory 1620 being coupled to the processor 1610. The memory 1620 may store various data, and furthermore, it may store a program 1630 for data processing, and execute the program 1630 under control of the processor 1610.

For example, the processor 1610 may be configured to execute the program to carry out the retransmission method for sidelink transmission as described in the embodiments of the third aspect. For example, the processor 1610 may be configured to execute the following control: receiving indication information (NACK) transmitted by a terminal equipment at a PUCCH associated with a configured grant resource, the indication information being used for indicating failure of sidelink transmission or that the network device is needed to schedule retransmission; and transmitting DCI of which CRC being scrambled by an SL-CS-RNTI; wherein the DCI and a dynamic grant resource scheduled by the DCI are after the PUCCH and before a next configured grant resource applicable to identical HARQ process, and the DCI schedules sidelink retransmission of the HARQ process.

Furthermore, as shown in FIG. 16, the network device 1600 may include a transceiver 1640, and an antenna 1650, etc. Functions of the above components are similar to those in the relevant art, and shall not be described herein any further. It should be noted that the network device 1600 does not necessarily include all the parts shown in FIG. 16, and furthermore, the network device 1600 may include parts not shown in FIG. 16, and the relevant art may be referred to.

The embodiment of this disclosure further provides a terminal equipment; however, this disclosure is not limited thereto, and it may also be another equipment.

Figure 17:
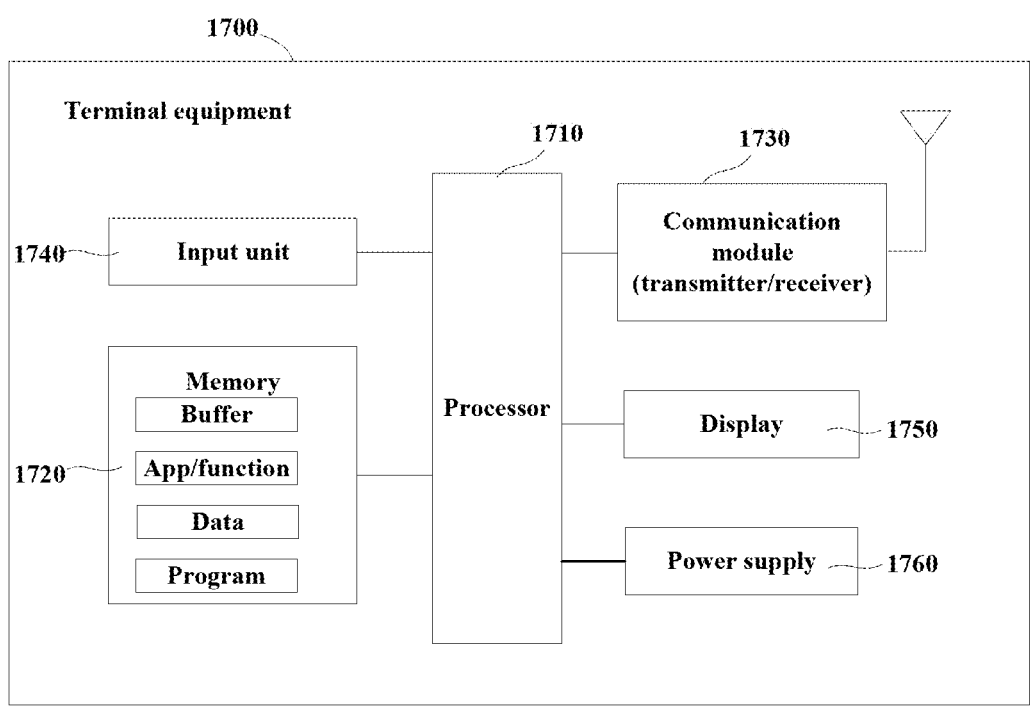
FIG. 17 is a schematic diagram of the terminal equipment of an embodiment of this disclosure.

FIG. 17 is a schematic diagram of the terminal equipment of the embodiment of this disclosure. As shown in FIG. 17, the terminal equipment 1700 may include a processor 1710 and a memory 1720, the memory 1720 storing data and a program and being coupled to the processor 1710. It should be noted that this figure is illustrative only, and other types of structures may also be used, so as to supplement or replace this structure and achieve a telecommunications function or other functions.

For example, the processor 1710 may be configured to execute a program to carry out the retransmission method for sidelink transmission as described in the embodiments of the first aspect. For example, the processor 1710 may be configured to perform the following control: receiving downlink control information (DCI) of which cyclic redundancy check (CRC) being scrambled by a sidelink configuration scheduling radio network temporary identifier (SL-CS-RNTI); and when a dynamic grant resource scheduled by the DCI is not used to transmit sidelink retransmission, transmitting indication information (ACK) via a physical uplink control channel (PUCCH) indicated by the DCI, the indication information (ACK) indicating success of sidelink transmission or that a network device is not needed to schedule retransmission;

or, receiving DCI of which CRC being scrambled by an SL-CS-RNTI; transmitting sidelink initial transmission by using a dynamic grant resource scheduled by the DCI; and transmitting indication information (NACK or ACK) via a physical uplink control channel indicated by the DCI, the indication information (NACK or ACK) being used for indicating whether sidelink transmission is successful or whether a network device is needed to schedule retransmission.

For example, the processor 1710 may be configured to execute a program to carry out the retransmission method for sidelink transmission as described in the embodiments of the second aspect. For example, the processor 1710 may be configured to perform the following control: receiving first DCI of which CRC being scrambled by an SL-CS-RNTI; transmitting sidelink retransmission by using a first dynamic grant resource scheduled by the first DCI, and in a case where the first downlink control information indicates or provides a physical uplink control channel, transmitting indication information to a network device via the physical uplink control channel; and starting a timer when the indication information indicates failure of sidelink transmission or that the network device is needed to schedule retransmission.

For example, the processor 1710 may be configured to execute a program to carry out the retransmission method for sidelink transmission as described in the embodiments of the third aspect. For example, the processor 1710 may be configured to perform the following control: transmitting indication information (NACK) at a PUCCH associated with a configured grant resource, the indication information (NACK) being used for indicating failure of sidelink transmission or that the network device is needed to schedule retransmission; and expecting or determining to receive the DCI of which CRC being scrambled by an SL-CS-RNTI and transmit sidelink retransmission on the dynamic grant resource scheduled by the DCI, after the PUCCH and before the next configured grant resource applicable to identical HARQ process; wherein the DCI schedules the sidelink retransmission of the HARQ process.

For example, the processor 1710 may be configured to execute a program to carry out the retransmission method for sidelink transmission as described in the embodiments of the fourth aspect. For example, the processor 1710 may be configured to perform the following control: performing sidelink transmission by using a configured grant resource, wherein one or more configured grant resources are associated with a physical uplink control channel, and the terminal equipment transmits at most one transport block (TB) in a period including the one or more configured grant resources and the physical uplink control channel.

As shown in FIG. 17, the terminal equipment 1700 may further include a communication module 1730, an input unit 1740, a display 1750, and a power supply 1760; wherein functions of the above components are similar to those in the relevant art, which shall not be described herein any further. It should be noted that the terminal equipment 1700 does not necessarily include all the parts shown in FIG. 17, and the above components are not necessary. Furthermore, the terminal equipment 1700 may include parts not shown in FIG. 17, and the relevant art may be referred to.

An embodiment of this disclosure provides a computer readable program, which, when executed in a terminal equipment, will cause the terminal equipment to carry out the retransmission method for sidelink transmission as described in the embodiments of the first to the fourth aspects.

An embodiment of this disclosure provides a storage medium, including a computer readable program, which, when executed in a terminal equipment, will cause the terminal equipment to carry out the retransmission method for sidelink transmission as described in the embodiments of the first to the fourth aspects.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

Supplement 1. A retransmission method for sidelink transmission, including:
receiving, by a terminal equipment, downlink control information (DCI) of which cyclic redundancy check (CRC) being scrambled by a sidelink configuration scheduling radio network temporary identifier (SL-CS-RNTI); and
when a dynamic grant resource scheduled by the downlink control information (DCI) is not used to transmit sidelink retransmission, transmitting indication information (ACK) via a physical uplink control channel indicated by the downlink control information (DCI), the indication information (ACK) indicating success of sidelink transmission or that a network device is not needed to schedule retransmission.

Supplement 2. The method according to supplement 1, wherein for the same hybrid automatic repeat request (HARD) process, before a time of the dynamic grant resource arrives, in a case where indication information (ACK) indicating success of sidelink transmission is received, the terminal equipment does not use the dynamic grant resource to transmit the sidelink retransmission.

Supplement 3. The method according to supplement 1, wherein for the same HARQ process, before a time of the dynamic grant resource arrives, in a case where a maximum number of times of transmission performed by using a configured grant resource is reached, the terminal equipment does not use the dynamic grant resource to transmit the sidelink retransmission.

Supplement 4. The method according to any one of supplements 1-3, wherein the method further includes:
at a physical uplink control channel associated with a configured grant resource, transmitting indication information (NACK) by the terminal equipment to the network device, the indication information (NACK) indicating failure of sidelink transmission or that the network device is needed to schedule retransmission.

Supplement 5. A retransmission method for sidelink transmission, including:
receiving, by a terminal equipment, DCI of which CRC being scrambled by an SL-CS-RNTI;
transmitting sidelink initial transmission by using a dynamic grant resource scheduled by the DCI; and
transmitting indication information (NACK or ACK) via a physical uplink control channel indicated by the DCI, the indication information (NACK or ACK) being used for indicating whether sidelink transmission is successful or whether a network device is needed to schedule retransmission.

Supplement 6. A retransmission method for sidelink transmission, including:
receiving, by a terminal equipment, first DCI of which CRC being scrambled by an SL-CS-RNTI;
transmitting sidelink retransmission by using a first dynamic grant resource scheduled by the first DCI;
in a case where the first DCI indicates or provides a physical uplink control channel, transmitting indication information to a network device at the physical uplink control channel; and
starting a timer when the indication information indicates failure of sidelink transmission or that the network device is needed to schedule retransmission.

Supplement 7. The method according to supplement 6, wherein before a time of the first dynamic grant resource arrives, the terminal equipment reaches a maximum number of times of transmission performed by using a configured grant resource.

Supplement 8. The method according to supplement 6, wherein after transmitting the indication information (NACK) indicating failure of sidelink transmission or that the network device is needed to schedule retransmission on a physical uplink control channel associated with a configured grant resource, the terminal equipment does not use a configured grant resource to transmit sidelink retransmission.

Supplement 9. The method according to any one of supplements 6-8, wherein the method further includes:
when the first DCI indicates that there does not exist or does not provide a physical uplink control channel, determining by the terminal equipment that a maximum number of times of sidelink transmission is reached.

Supplement 10. The method according to any one of supplements 6-9, wherein in a case where the first DCI schedules a plurality of first dynamic grant resources and the plurality of first dynamic grant resources are associated with a plurality of physical uplink control channels, the timer is started after a last physical uplink control channel in the plurality of physical uplink control channels.

Supplement 11. The method according to any one of supplements 6-10, wherein the method further includes:

receiving, by the terminal equipment during running period of the timer, second DCI of which CRC being scrambled by an SL-CS-RNTI.

Supplement 12. The method according to supplement 11, wherein the method further includes:

in a case where the second DCI is received during running period of the timer, using by the terminal equipment, a second dynamic grant resource scheduled by the second DCI to transmit sidelink retransmission.

Supplement 13. The method according to supplement 11, wherein the method further includes:

in a case where the second DCI is received during running period of the timer and the second DCI indicates that there does not exist or does not provide a physical uplink control channel, determining by the terminal equipment that the maximum number of times of sidelink transmission is reached.

Supplement 14. The method according to supplement 11, wherein the method further includes:

in a case where the second DCI is received during running period of the timer and the second DCI indicates or provides a physical uplink control channel, transmitting indication information by the terminal equipment to the network device at the physical uplink control channel; and starting or restarting the timer in a case where the indication information indicates failure of the sidelink transmission or that the network device is needed to schedule retransmission.

Supplement 15. The method according to any one of supplements 11-14, wherein the method further includes:

in a case where the second DCI schedules a plurality of second dynamic grant resources and the plurality of second dynamic grant resources are associated with a plurality of physical uplink control channels, the timer is started or restarted after the last physical uplink control channel in the plurality of physical uplink control channels.

Supplement 16. The method according to any one of supplements 6-15, wherein the timer is started or restarted in at one of the following cases where:

the terminal equipment receives DCI used for scheduling retransmission;

the terminal equipment transmits a physical sidelink shared channel (PSSCH) scheduled by the DCI; or the terminal equipment transmits a physical uplink control channel indicated by the DCI.

Supplement 17. The method according to any one of supplements 6-16, wherein a time length of the timer is semi-statically configured or dynamically determined.

Supplement 18. The method according to any one of supplements 6-16, wherein a time length of the timer starts from after a time domain position of a physical uplink control channel indicated by DCI or a time domain position of a physical uplink control channel associated with a configured grant resource, and ends before a time domain position of a physical uplink control channel associated with a next configured grant resource applicable to the same hybrid automatic repeat request (HARQ) process.

Supplement 19. The method according to any one of supplements 6-16, wherein the time length of the timer is configured to be of a predetermined value or infinity.

Supplement 20. A retransmission method for sidelink transmission, including:

transmitting, by a terminal equipment, indication information (NACK) via a physical uplink control channel associated with a configured grant resource to a network device, the indication information (NACK) being used for indicating failure of sidelink transmission or that a network device is needed to schedule retransmission; and expecting or determining, by the terminal equipment, to receive DCI of which CRC being scrambled by an SL-CS-RNTI and transmitting sidelink retransmission by using a dynamic grant resource scheduled by the DCI, after the physical uplink control channel and before a next configured grant resource applicable to identical hybrid automatic repeat request (HARQ) process; wherein the DCI schedules sidelink retransmission of the HARQ process.

Supplement 21. A retransmission method for sidelink transmission, including:

receiving, by a network device, indication information (NACK) transmitted by a terminal equipment at a PUCCH associated with a configured grant resource, the indication information (NACK) being used for indicating failure of sidelink transmission or that the network device is needed to schedule retransmission; and transmitting, by the network device, DCI of which CRC being scrambled by an SL-CS-RNTI; wherein the DCI and a dynamic grant resource scheduled by the DCI are after the PUCCH and before a next configured grant resource applicable to identical HARQ process, and the DCI schedules sidelink retransmission of the HARQ process.

Supplement 22. A retransmission method for sidelink transmission, including:

performing, by a terminal equipment, sidelink transmission by using a configured grant resource;

wherein one or more configured grant resources are associated with a physical uplink control channel, and the terminal equipment transmits at most one transport block (TB) within a period including the one or more configured grant resources and the physical uplink control channel.

Supplement 23. A terminal equipment, including a memory and a processor, the memory storing a computer program, and the processor being configured to execute the computer program to carry out the retransmission method for sidelink transmission as described in any one of supplements 1-22.

Supplement 24. A communication system, including the terminal equipment as described in supplement 23.

What is claimed is:

1. A retransmission apparatus for sidelink transmission, comprising:

a receiver configured to receive downlink control information of which cyclic redundancy check being scrambled by a sidelink configuration scheduling radio network temporary identifier; and a transmitter configured to, when it does not transmit a sidelink retransmission on a dynamic grant resource scheduled by the downlink control information, transmit indication information via a physical uplink control channel indicated by the downlink control information, the indication information indicating success of sidelink transmission or that a network device is not needed to schedule retransmission.

2. The apparatus according to claim 1, wherein for a hybrid automatic repeat request process, before a time of the dynamic grant resource arrives, in a case where indication information indicating success of sidelink transmission is received, the transmitter does not use the dynamic grant resource to transmit the sidelink retransmission.

3. The apparatus according to claim 1, wherein for a hybrid automatic repeat request process, before a time of the dynamic grant resource arrives, in a case where a maximum number of times of transmission performed by using a configured grant resource is reached, the transmitter does not use the dynamic grant resource to transmit the sidelink retransmission.

4. The apparatus according to claim 1, wherein the transmitter is further configured to:
via a physical uplink control channel associated with a configured grant resource, transmit indication information to the network device, the indication information indicating failure of sidelink transmission or that the network device is needed to schedule retransmission.

5. A retransmission apparatus for sidelink transmission, configured in a terminal equipment, the apparatus comprising:
a receiver configured to receive first downlink control information of which cyclic redundancy check being scrambled by a sidelink configuration scheduling radio network temporary identifier;
a transmitter configured to transmit sidelink retransmission by using a first dynamic grant resource scheduled by the first downlink control information, and in a case where the first downlink control information indicates or provides a first physical uplink control channel, transmit first indication information to a network device via the first physical uplink control channel;
wherein in a case where second indication information indicates failure of sidelink transmission or that the network device is needed to schedule retransmission via a second physical uplink control channel associated with a configured grant resource, after transmitting the second indication information, the transmitter does not use a configured grant resource to transmit sidelink retransmission.

6. The apparatus according to claim 5, the apparatus further comprising:
processor circuitry configured to start a timer when the first indication information and/or the second indication information indicate failure of sidelink transmission or that the network device is needed to schedule retransmission.

7. The apparatus according to claim 6, wherein the processor circuitry is further configured to, before a time of the first dynamic grant resource arrives, determine that the terminal equipment reaches a maximum number of times of transmission performed by using configured grant resource(s).

8. The apparatus according to claim 6, wherein the processor circuitry is further configured to, when the first downlink control information indicates that there does not exist or does not provide the first physical uplink control channel, determine that the terminal equipment reaches a maximum number of times of sidelink transmission.

9. The apparatus according to claim 6, wherein in a case where the first downlink control information schedules a plurality of first dynamic grant resources and the plurality of first dynamic grant resources are associated with a plurality of physical uplink control channels, the timer is started after a last physical uplink control channel in the plurality of physical uplink control channels.

10. The apparatus according to claim 6, wherein the receiver is further configured to:
during running period of the timer, receive second downlink control information of which cyclic redundancy check being scrambled by a sidelink configuration scheduling radio network temporary identifier.

11. The apparatus according to claim 10, wherein the transmitter is further configured to:
in a case where the receiver receives the second downlink control information during running period of the timer, use a second dynamic grant resource scheduled by the second downlink control information to transmit sidelink retransmission.

12. The apparatus according to claim 10, wherein the processor circuitry is further configured to:
in a case where the receiver receives the second downlink control information during running period of the timer and the second downlink control information indicates that there does not exist or does not provide a physical uplink control channel, determine that the terminal equipment reaches the maximum number of times of sidelink transmission.

13. The apparatus according to claim 10, wherein the transmitter is further configured to, in a case where the receiver receives the second downlink control information during running period of the timer and the second downlink control information indicates or provides a physical uplink control channel, transmit indication information to the network device via the physical uplink control channel;
and the processor circuitry is further configured to: start or restart the timer in a case where the indication information indicates failure of the sidelink transmission or that the network device is needed to schedule retransmission.

14. The apparatus according to claim 10, wherein in a case where the second downlink control information schedules a plurality of second dynamic grant resources and the plurality of second dynamic grant resources are associated with a plurality of physical uplink control channels, the timer is started or restarted after the last physical uplink control channel in the plurality of physical uplink control channels.

15. The apparatus according to claim 6, wherein the timer is started or restarted in at one of the following cases where:
the terminal equipment receives DCI used for scheduling retransmission;
the terminal equipment transmits a physical sidelink shared channel (PSSCH) scheduled by the DCI; or
the terminal equipment transmits a physical uplink control channel indicated by the DCI.

16. The apparatus according to claim 6, wherein a time length of the timer is semi-statically configured or dynamically determined.

17. The apparatus according to claim 6, wherein a time length of the timer starts from after a time domain position of a physical uplink control channel indicated by downlink control information or a time domain position of a physical uplink control channel associated with a configured grant resource, and ends before a time domain position of a physical uplink control channel associated with a next configured grant resource applicable to the same hybrid automatic repeat request process.

18. The apparatus according to claim 6, wherein the time length of the timer is configured to be of a predetermined value or infinity.

19. A retransmission apparatus for sidelink transmission, comprising:
- a receiver configured to receive indication information transmitted by a terminal equipment via a physical uplink control channel associated with a configured grant resource, the indication information being used for indicating failure of sidelink transmission or that a network device is needed to schedule retransmission; and
- a transmitter configured to transmit downlink control information of which cyclic redundancy check being scrambled by a sidelink configuration scheduling radio network temporary identifier; wherein the downlink control information and a dynamic grant resource are after the physical uplink control channel and before a next configured grant resource applicable to a hybrid automatic repeat request process, and the downlink control information schedules the dynamic grant resource and schedules sidelink retransmission of the hybrid automatic repeat request process.

20. A retransmission apparatus for sidelink transmission, comprising:
- a transmitter configured to transmit indication information via a physical uplink control channel associated with a configured grant resource, the indication information being used for indicating failure of sidelink transmission or that a network device is needed to schedule retransmission; and
- a receiver configured to receive downlink control information of which cyclic redundancy check being scrambled by a sidelink configuration scheduling radio network temporary identifier;
- the transmitter is further configured to transmit sidelink retransmission by using a dynamic grant resource scheduled by the downlink control information, after the physical uplink control channel and before a next configured grant resource applicable to a hybrid automatic repeat request process, wherein the downlink control information schedules sidelink retransmission of the hybrid automatic repeat request process.

* * * * *